US009928463B2

(12) United States Patent
Miao et al.

(10) Patent No.: US 9,928,463 B2
(45) Date of Patent: Mar. 27, 2018

(54) EPISODIC AND SEMANTIC MEMORY BASED REMEMBRANCE AGENT MODELING METHOD AND SYSTEM FOR VIRTUAL COMPANIONS

(71) Applicant: NANYANG TECHNOLOGICAL UNIVERSITY, Singapore (SG)

(72) Inventors: Chunyan Miao, Singapore (SG); Xiaogang Han, Singapore (SG); Zhiqi Shen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 449 days.

(21) Appl. No.: 14/668,291

(22) Filed: Mar. 25, 2015

(65) Prior Publication Data
US 2015/0278688 A1    Oct. 1, 2015

Related U.S. Application Data

(60) Provisional application No. 61/970,065, filed on Mar. 25, 2014.

(51) Int. Cl.
| | |
|---|---|
| G06N 5/02 | (2006.01) |
| G06F 17/30 | (2006.01) |
| G06F 1/16 | (2006.01) |
| G06Q 30/02 | (2012.01) |

(52) U.S. Cl.
CPC ............ *G06N 5/022* (2013.01); *G06F 1/163* (2013.01); *G06F 17/30719* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 2001/0040986 A1 | 11/2001 | Farringdon et al. | |
| 2012/0249797 A1* | 10/2012 | Haddick | G06F 1/163 348/158 |
| 2014/0171039 A1* | 6/2014 | Bjontegard | H04L 29/06034 455/414.1 |

(Continued)

OTHER PUBLICATIONS

Qiong Wu et al., "The Innovative Application of Learning Companions in Chronicles of Singapura". Proceedings of the 12th International Conferences on Autonomous Agents and Multiagent Systems, May 6-10, 2013, Saint Paul, Minnesota, USA.

*Primary Examiner* — Alan Chen
(74) *Attorney, Agent, or Firm* — Sughrue Mion, PLLC

(57) ABSTRACT

A remembrance agent is proposed, to be hosted on a wearable computer. The remembrance agent employs a first database (WK) of knowledge about the world in the form of concept maps. Events ("episodes") experienced by a user are each classified as relating to one or more of the concepts in WK. The episodes are used to produce a second database (episodic memory, EM), and the classification is also used to update a third database (semantic memory, SM) organized using the concepts. The semantic memory thus summarizes the user's interaction with the concepts during the episodes. A current situation of the user is classified according to the concepts, and the classification is used, with the EM and SM, to provide to the user information relevant to the current situation.

2 Claims, 2 Drawing Sheets

(56) References Cited

U.S. PATENT DOCUMENTS

| | | | | |
|---|---|---|---|---|
| 2014/0347265 A1* | 11/2014 | Aimone | ................ | G09G 3/003 |
| | | | | 345/156 |
| 2015/0294085 A1* | 10/2015 | Kare | .................... | G06F 19/322 |
| | | | | 705/3 |
| 2015/0324698 A1* | 11/2015 | Karaoguz | ........... | G06F 19/3437 |
| | | | | 706/46 |

* cited by examiner

EPISODIC AND SEMANTIC MEMORY BASED REMEMBRANCE AGENT MODELING METHOD AND SYSTEM FOR VIRTUAL COMPANIONS

FIELD OF THE INVENTION

The present invention relates to a software agent to be hosted by a computer, such as a wearable computer worn by a user, for providing information to the user.

SUMMARY OF THE INVENTION

A software agent is a computer program that acts for a user or other program in a relationship of agency. The basic attributes of a software agent are that agents are not strictly invoked for a task, but activate themselves, and do not require interaction of a user. Agents may reside in a wait status on a host, perceiving context. They often enter run status on a host upon the host starting. Sometimes, they are operative to invoke other tasks including communication.

The concept of a remembrance agent was first introduced as a tool for just-in-time information retrieval [1]. A remembrance agent is a program that continuously "watches over the shoulder" of the user and provides information relevant to the current context. The remembrance agent provides just-in-time support when the user is facing a new problem. The remembrance agent typically communicates verbally with sound as a supplementary tool. The distinction between a remembrance agent and other agents is that a remembrance agent provides descriptions of previous experiences of the user (e.g. in one or more previous scenes related to the current scene). By contrast other agents give just provide knowledge related to the current problem, and users have to think for themselves to find out the connections between the current problem and the past scenes.

To use the remembrance agent, the user is required to wear a wearable computer which hosts the remembrance agent and includes a detector, which generates input for the wearable computer so that the user's activities can be sensed. Then the agent automatically displays information that might be relevant in that environment on a head-up display. The remembrance agent works by remembering the user's past experiences and associating the user's current situations with the past experiences to augment the user's memory.

A number of just-in-time information retrieval agents are known. For example, the Memex [2, 3], proposed by Bush, is a theoretical proto-hypertext computer system in which an individual stores all his books, records, and communications. Additionally, an individual can create annotations and associative trails on the documents in the library. Ideally, the device would act as human memory extender and recall those trails when needed. However, Memex was never built because, according to Bush [4], the idea was before its time.

Since Forget-me-not [5] disclosed the possibility of intimate computing (supporting human memory using user's context) back in the early nineties, the notion of augmenting human memory (or memory prosthesis) has become an important application domain in the research field of context-aware computing. In essence, the approach adopted by Forget-me-not is to utilize the user's context in order to index personal episodic information. However, the approach in Forget-me-not does not explicitly support the user's interests or preferences using any form of user model [6]. The approach in Forget-me-not does not model the user's current context to automatically recall relevant historical information, but requires the user to search explicitly within incomplete contexts related to certain historical activities.

Likewise, [9] proposes a memory device worn by a user, and including a camera to capture images of people the user encounters. A face recognition process compares faces in the captured images with faces held in a storage means which have been previously captured, and upon establishing a face match, the previously captured image is displayed to the user.

Rhodes defined the term just-in-time information retrieval (JITIR) agent and implemented three JITIR agents. The first one is a Remembrance Agent (RA) [7] which augments human memory by displaying a list of documents possibly relevant to the current user context. Unlike most information retrieval systems, the RA runs continuously and proactively to detect the current user context and index historical information without user intervention. Its unobtrusive interface enables a user to pursue or ignore the RA's suggestions as desired. The second one is a wearable RA [1, 8-10], which takes physical context such as location and people in the immediate area into consideration, but Rhodes concluded that the location and people in the area are poor distinguishing features for a note-taking RA. The third one [9] is an automatic just-in-time information system for the Web. The RA here does not have knowledge of the user's interests or whether the user has previously seen a particular suggestion.

JITIRs are characterized as a type of contextual information retrieval agent that provides information retrieval and context based information filtering. Watson [11, 12] uses a simple and explicit task model to interpret user actions (interaction with everyday applications) in order to anticipate a user's information need by querying Internet information sources for information. Letizia [13] assists users in browsing the Web by suggesting and displaying relevant web pages based on user interests. The difference between Letizia and Rhodes's RAs is that the RAs remember the past—show the user relevant material that they have already seen, whereas Letizia remembers the future—shows relevant material not yet seen.

SUMMARY OF THE INVENTION

As noted above, a remembrance agent is supposed to continuously keep track of the user's information access history and infer the user's preferences to support autonomously retrieving information based on the user's local context. However, most existing remembrance agents fail to model the user's knowledge level or preferences as a type of memory, which the present inventors consider to be an important source of evidence for inference. The tasks of storing user historical information in different types of memory (thereby providing a knowledge base), detection and interpretation of local contexts for autonomous retrieval, and modeling user interests based on diverse information sources, are all significant challenges.

In general terms, the present invention proposes that a remembrance agent which employs a first database (WK) of knowledge about the world in the form of concept maps. Events ("episodes") experienced by the user are each classified as relating to one or more of the concepts in WK. The episodes are used to produce a second database (episodic memory, EM), and the classification is also used to update a third database (semantic memory, SM) organised using the concepts. The semantic memory thus summarizes the user's interaction with the concepts during the episodes.

The information which the EM stores about each episode is referred to as a document, and the documents may be stored in the EM in chronological order. The SM stores data encoding those concepts which were extracted from the documents in the EM and their corresponding aggregated activation scores.

In use, the remembrance agent is hosted by a computer having one or more sensors for obtaining current information about the user ("user context"). The user context is used to identify currently relevant ones of the concepts, and thereby to extract from the EM information about previous episodes in which the same concepts were relevant, and using the SM to extract information from additional databases using the concepts.

Thus, the invention proposes an RA model, which is an Episodic and Semantic memory based Remembrance Agent (ESRA). The model is inspired by cognitive memory theories. The ESRA incorporates the functionalities of episodic memory (EM) and semantic memory (SM) of the human memory into the agent's memory structure. By explicitly modeling EM and SM and their functional interactions, the embodiment can capture both the episodic information and categorical semantic information to improve the memory retrieval performance.

Moreover, with an ontological user interest profile constructed from the aggregated categorical concepts in SM, the ESRA is able to provide accurate personalized recommendations for the user.

The present inventors have realised that a significant problem with previously proposed JITIRs is that most of them are designed from the information retrieval perspective, in which ranking is the only measurement approach to retrieve information. However in the real world, it is necessary to organize documents [14, 15] to facilitate user browsing through the documents. The episodic memory and semantic memory in the proposed remembrance agent model supports meta-data relevance and topic relevance, respectively, to address the problem.

A user's documents are naturally distributed in multiple information sources. Each of the sources is of different characteristics and significance. This contradicts the assumptions made by most of the existing work that the user documents are collected from a single information source. In addition, we propose an approach for unifying a user's historical documents from multiple information sources, and subsequently develop a source-aware retrieval algorithm to complement the user's cognition ability with the proposed ESRA in various scenarios.

One shortcoming of previous JITIRS is that user interests are not explicitly modeled in JITIRs. Instead, previous research focuses on presenting information based on common knowledge corpus rather than personal knowledge repository of the particular user [16]. The proposed RA addresses this problem with the concept based user interests modeling provided by the semantic memory.

The proposed remembrance agent model is applicable to various interactive virtual environments, personal information management systems, and lifelong user information management systems. Embodiments of the invention have a number of possible applications. One of these is to accompany a user (customer) during a shopping experience. The embodiment makes it possible to understand the customer's preferences and shopping needs. This makes it possible to properly infuse product recommendations into the human-computer interaction process, and thereby potentially help virtual companions to achieve persuasive goals. For example, if a sales agent can successfully elicit the customer's preference in a product, there will be a higher chance that this product is sold.

The invention may be expressed as a method. Alternatively, it may be expressed as a computer system, such as a wearable computer (although in other useful embodiments the computer system may be a standard desktop or laptop personal computer (PC), a smartphone or a tablet PC), having a data storage device and storing program instructions operative by a processor of the computer system to cause the processor to perform the method.

The method is preferably performed automatically, that is substantially without human involvement, except optionally for initiation by the user (e.g. by turning the wearable computer on), and for any input by the user to confirm that the user wishes to obtain further information about a document proposed by the remembrance agent.

BRIEF DESCRIPTION OF THE FIGURES

A non-limiting example of the invention will now be described for the sake of example only with reference to the following figures, in which.

DETAILED DESCRIPTION OF THE EMBODIMENT

Figure 1:
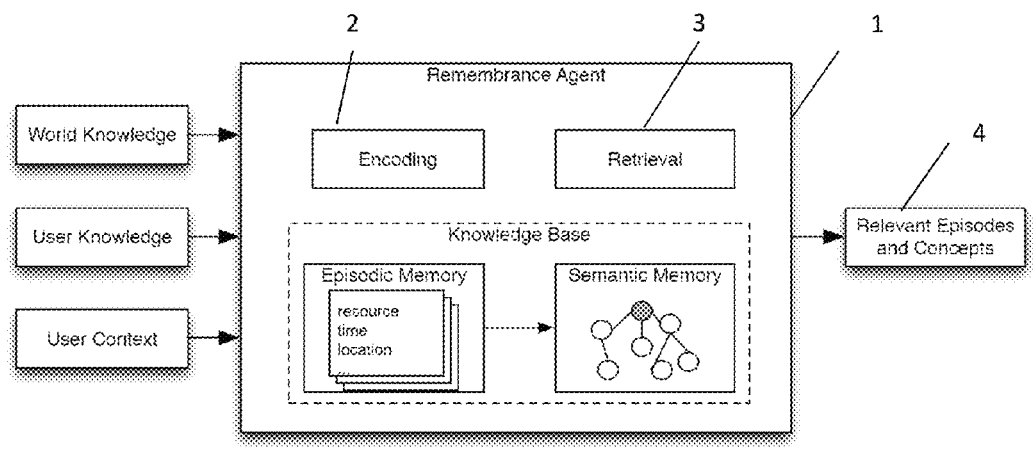
FIG. 1 shows schematically a remembrance agent which is an embodiment of the present invention.

An embodiment 1 of the invention is illustrated in FIG. 1. The embodiment is a "Remembrance Companion" model, which runs on a host such as a wearable computer, worn by a user. The wearable computer has at least one sensor for detecting the environment of the user and/or the behavior of the user. The sensors typically comprise a device for determining the location of the user. The wearable computer also has at least one data input device for receiving input from the user. It further has at least one information transmission device for transmitting information to the user, such as a speaker (e.g. headphone and/or a loudspeaker) and/or a display device with a screen, such as a head-up display device.

The remembrance companion perceives three sources of information: predefined world knowledge WK, user knowledge UK and user context UC. The agent proactively monitors the user's behavior using the sensor(s), to generate the UC.

The embodiment 1 contains first software 2 for using WK, UK and UC to generate a database EM of episodes the user experiences, and from it a second database SM summarizing the user's knowledge. UK represents the user profile, which includes the interests of the user. Such information is useful to infer the preferences of user when presented with large amount of information in the new context. In such case, the agent will filter the external information based on their relevance to the user's existing preferences and interests.

The embodiment further contains software 3 for detecting from the UC when the user is stuck, and retrieving relevant information to help him. There are various ways in which the system may detect the user is stuck. A first way of doing this, if the user is detected to be in a situation in which a choice has to be made, is that the system may detect that the user is taking a longer time than a predetermined expected time to make a decision. For example, if the user is detected to be in a retail location where many similar products are on sale, the system may be operative to detect that the user is spending a long time choosing between the products. In another example, if the user is in a situation in which a question is put to him or her, the system may detect that the user is unable to answer the question. In further examples, the system may detect that the user is asking for help, or is spending a long time solving a problem.

Upon detecting that the user is stuck, the software 3 will retrieve the most relevant concepts 4 to help the user solve the problems, by a method such as that shown in FIG. 3 (see below).

In the virtual environment, the world knowledge WK is represented as concept maps. A given concept is denoted by c, and the set of concept is denoted by C.

For the remembrance companion, the user's learning behaviors are represented by episodes. The set of episodes is denoted by E, and each episode, denoted as e, represents a learning event via which the user u interacted with a set of concepts set(c) (which is a subset of C) at time t and location lx;y;z. Optionally, an episode may also include the user's friends fs and the set of concepts cse. Thus, $$e=(u;t;lx;y;z;set(c);fs)$$

The player's real-time context, which is a special kind of episode, is denoted as ec.

The episodes are encoded and stored in the agent's episode memory [16], denoted as EM. We have, $$EM=\{e1,\ldots,en\}$$

where n is the total number of episodes encoded for a single user.

The episodes stored in EM can serve as evidence about the user's interaction with the learning concepts.

Figure 2:
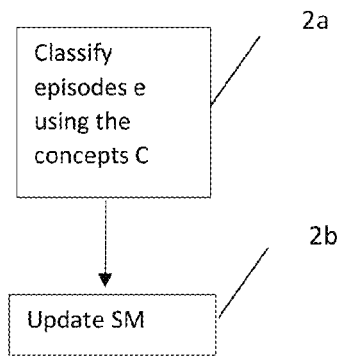
FIG. 2 is a flow diagram of the process of generating the episodic memory (EM) and semantic memory (SM) for the embodiment of FIG. 1.

FIG. 2 shows a process for constructing the EM and SM. It may be performed episode-by-episode as episodes occur, or alternatively when a certain number of episodes have already occurred. Information about the episodes is available from the sensors, describing the user's behavior.

A consolidating algorithm is performed (step 2*a*) which classifies a given episode according to the concepts C (i.e. determines which of the concepts are relevant to the episode) using the user behavior. The consolidation algorithm regards the consolidating problem as a multi-label episode classification problem, in which each concept in WK is considered as a class label.

The objective of the classification algorithm is to classify each episode in EM as relating to one or more concepts of the concepts C in WK, given the features of the episode. The classification assumes that a collection of training data has already been collected from real world (WK). The training data is in the form of a number of training episodes, each of which includes the features of the episode and the corresponding concept label(s) that the episode can be mapped to. Given a new episode for which we do not know the corresponding concept(s), we can calculate activation scores of the each of the candidate concepts and then determine the most likely target concept(s) for the episode. The data encoding and activation scores are well-known terms to a person specialized in information retrieval systems. There are many standard approaches which can derive them based on a text document.

This allows us to estimate the user's knowledge with regards to the concepts defined in WK. In step 2*b*, the algorithm stores data about which concepts were involved in each of the episodes in the agent's semantic memory SM. The EM only stores the documents describing corresponding episodes (it does not store the associated concepts derived by the classification algorithm). However, the EM and SM are connected with each other, so that when the agent needs to rely on the information stored in SM to retrieve a document describing the episode, it can calculate the mapping from an episode to a set of concepts and use the resultant mapping to improve the episode retrieval algorithm.

Figure 3:
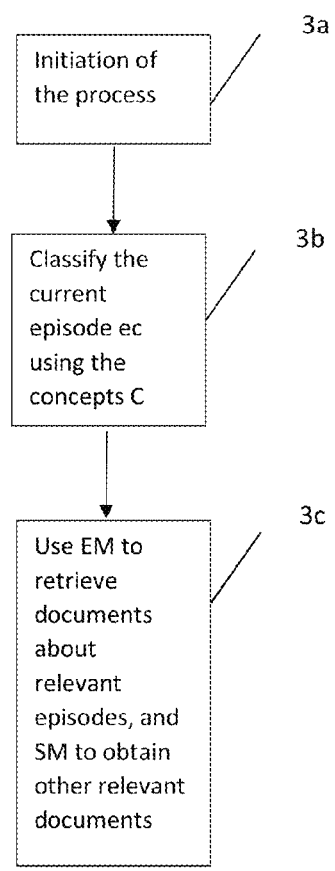
FIG. 3 is a flow diagram of an information retrieval process using the embodiment of FIG. 1.

FIG. 3 shows how the remembrance companion is used. In step 3*a* there is an initiation of the process (e.g. that system determines that the user is stuck, by the methods described above). In step 3*b*, the system classifies the current episode ec using the same consolidation algorithm, to determine which concept(s) 4 from C are relevant to it. In step 3*c*, the system retrieves from the EM documents describing previous episodes relating to similar concepts, and/or/ uses SM to search additional databases (within the wearable computer or external to it but accessible to the wearable computer by wireless communication) for documents related to the concepts. The user may be immediately presented with these documents (using one of more of the information transmission devices), or he may be given a list of them in order for the user to select, using the data input device(s), which of them to be told about in more detail.

The embodiment has several applications. One is as a virtual companion for e-commerce to provide users (customers) with better shopping experiences. Firstly, a shopping companion with memory is able to detect potential interesting commercial products and recommend them to users. For example, the C maybe chosen to be concepts relevant to commerce (e.g. price, quality), and the SM may be used to determine the user's typical interests (e.g. fine wine, at a low price), and, once it is detected that the user is in the wine department of a shop, to retrieve information about various wines available cheaply at the store.

Secondly, through the historical customer documents, a shopping companion may apply an efficient shopping plan for customers to optimize their shopping experience. For instance, when the customer is detected being stuck (e.g. the user is spending long time to find a product, asking for help, or stuck in a place for long) in certain context, the agent will extract relevant episodes in the EM or helping objects in the SM, and present the information in a nonintrusive manner. In the example above (the shopping companion for a customer who is interested in wines) this could be information about which wines the customer bought before.

The system is able to unify a user's historical documents from multiple information sources, and subsequently develop a source-aware retrieval algorithm to complement the user's cognition ability with the proposed ESRA in various scenarios. With the authorization of the user, the agent will collect the user's documents together with the user's context from multiple information sources of the user. Such documents and context provide rich information about relevance of the corresponding documents and the user. When the user needs any of the relevant historical document in a new context, the agent will be able to retrieve them based on different relevant measures and present the information proactively to the user.

Optionally, the customer can also occasionally explore EM and SM to review the events he had experienced in the past and the knowledge he has obtained so far as a shopping notes. Hence, the shopping companion with memory may provide the users with a more convenient and enjoyable shopping experience, as well as benefit the product providers by selling more products.

Although only a single embodiment of the invention has been described, many variations are possible within the scope and spirit of the invention. For example, applications of the embodiment exist which are unrelated to retailing of product to consumers, such as systems which provide a companion to students tackling a learning task. In this case, the WK may define the learning task.

REFERENCES

The disclosure of the following references is hereby incorporated by reference in its entirety.

[1] B. J. Rhodes, "The wearable remembrance agent: A system for augmented memory," *Personal and Ubiquitous Computing*, vol. 1, pp. 218-224, 1997.

[2] V. Bush and A. W. M. Think, "As We May Think," *The Atlantic Monthly*, vol. 176, pp. 101-108, 1945.

[3] V. Bush, "As we may think," *Reading digital culture*, p. 9, 2001.

[4] V. Bush, "Memex revisited," in *From Memex to hypertext*, ed: Academic Press Professional, Inc., 1991, pp. 197-216.

[5] M. Lamming and M. Flynn, "Forget-me-not: Intimate computing in support of human memory," in *Proceedings of FRIEND21* vol. 94, ed, 1994, pp. 2-4.

[6] H. E. Byun and K. Cheverst, "Exploiting user models and context-awareness to support personal daily activities," in *Workshop in UM2001 on User Modelling for Context-Aware Applications, Sonthofen, Germany*, ed, 2001.

[7] B. Rhodes and T. Starner, "Remembrance Agent: A continuously running automated information retrieval system," in *Proceedings of the First International Conference on the Practical Application of Intelligent Agents and Multi Agent Technology*, ed, 1996, pp. 487-495.

[8] B. Rhodes, "Using physical context for just-in-time information retrieval," *IEEE Transactions on Computers*, vol. 52, pp. 1011-1014, 2003.

[9] B. J. Rhodes, "Margin notes: Building a contextually aware associative memory," in *Proceedings of the 5th international conference on Intelligent user interfaces*, ed, 2000, pp. 219-224.

[10] D. Robins, "Interactive information retrieval: context and basic notions," *Informing Science*, vol. 3, pp. 57-62, 2000.

[11] D. Leake, R. Scherle, J. Budzik, and K. Hammond, "Selecting task-relevant sources for just-in-time retrieval," in *Proceedings of the AAAI-99 Workshop on Intelligent Information Systems*, ed, 1999.

[12] J. Budzik and K. J. Hammond, "User interactions with everyday applications as context for just-in-time information access," in *Proceedings of the 5th international conference on Intelligent user interfaces*, ed, 2000, pp. 44-51.

[13] H. Lieberman, "Autonomous interface agents," in *Proceedings of the SIGCHI conference on Human factors in computing systems*, ed, 1997, pp. 67-74.

[14] H. J. Zeng, Q. C. He, Z. Chen, W. Y. Ma, and J. Ma, "Learning to cluster web search results," in *Proceedings of the 27th annual international ACM SIGIR conference on Research and development in information retrieval*, ed, 2004, p. 217.

[15] D. Ramage, P. Heymann, C. D. Manning, and H. Garcia-Molina, "Clustering the tagged web," in *Proceedings of the Second ACM International Conference on Web Search and Data Mining*, ed, 2009, pp. 54-63.

[16] B. J. Rhodes, "Just-in-time information retrieval," Massachusetts Institute of Technology, 2000.

[17] US 2001/0040986 A1, "Memory aid".

The invention claimed is:

1. A method of obtaining information relevant to a current situation,
the method being performed by a computer system comprising:
a computer processor;
at least one sensor for determining at least one characteristic of the user,
at least one data input device for receiving input from the user;
at least one information transmission device for transmitting information to the user; and
a data storage device, the data storage device storing:
(i) an episodic memory database of documents, each document representing a respective previous episode experienced by the user; and
(ii) a semantic memory database indicative of the incidence in the previous episodes of each of a plurality of predefined concepts C;
the method comprising:
(a) using data obtained using the at least one sensor to classify the current situation according to the plurality of predefined concepts C, to derive a current concept set which is one or more of said predefined concepts C, the current concept set being those of the predefined concepts C which are relevant to the current situation; and
(b) using the current concept set, the episodic memory and the semantic memory to obtain additional data relevant to the current situation
wherein the method further comprises a preliminary step of generating the semantic memory by:
classifying the documents in the episodic memory according to the predefined concepts C to determine a sub-set of the predefined concepts relevant to each of the documents, and
for each document, updating the semantic memory according to the corresponding derived sub-set of the predefined concepts.

2. A method according to claim 1 which is performed when the user is in a retail environment, the additional data comprising at least data describing products which are for sale in the retail environment.

* * * * *